United States Patent
Lee et al.

(10) Patent No.: US 10,389,051 B2
(45) Date of Patent: Aug. 20, 2019

(54) CONNECTOR STRUCTURE WITH STANDOFF REGION FOR IMPROVED SOLDERING AND METHOD OF MAKING THE SAME

(71) Applicant: ARRIS Enterprises LLC, Suwanee, GA (US)

(72) Inventors: Jui-Feng Lee, New Taipei (TW); Liang Kun Chang, Keelung (TW)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/789,449

(22) Filed: Oct. 20, 2017

(65) Prior Publication Data
US 2019/0123463 A1    Apr. 25, 2019

(51) Int. Cl.
| H01R 33/00 | (2006.01) |
| H01R 12/70 | (2011.01) |
| H01R 12/71 | (2011.01) |
| H01R 4/02  | (2006.01) |

(52) U.S. Cl.
CPC .......... *H01R 12/7082* (2013.01); *H01R 4/02* (2013.01); *H01R 12/716* (2013.01)

(58) Field of Classification Search
CPC ............. H01R 12/7082; H01R 12/707; H01R 12/716; H01R 4/02; H01R 13/6585; H01R 13/6463; H01R 13/65802; H01R 13/635
See application file for complete search history.

(56) References Cited

U.S. PATENT DOCUMENTS

| 5,029,748 A | 7/1991 | Lauterbach et al. |
| 7,226,298 B1 | 6/2007 | Minich |
| 9,166,342 B1* | 10/2015 | Tao .................... H01R 13/6581 |
| 2010/0022135 A1* | 1/2010 | Hamner ........... H01R 13/65802 |
| | | 439/630 |
| 2014/0030913 A1* | 1/2014 | Chang .............. H01R 13/65802 |
| | | 439/540.1 |
| 2015/0044893 A1* | 2/2015 | Chen .................... H01R 31/065 |
| | | 439/217 |
| 2015/0044906 A1* | 2/2015 | Tian ................... H01R 13/6463 |
| | | 439/587 |

(Continued)

FOREIGN PATENT DOCUMENTS

EP    1376763 A1    2/2004

OTHER PUBLICATIONS

PCT International Search Report & Written Opinion, Re: Application No. PCT/US2018/056187, dated Mar. 6, 2019.

*Primary Examiner* — Jean F Duverne
(74) *Attorney, Agent, or Firm* — Larry T. Cullen

(57) ABSTRACT

A connector structure used in pin in paste soldering includes a standoff region with dimensions that provide reflow air convection on at least two sides of a surface of the connector structure during Pin In Paste (PIP) soldering. For example, the standoff region has a depth or height of approximately 0.3 mm, a length of approximately 15.1 mm, and a width of approximately 4.95 mm. The standoff region can also have a depth or height in a range of 0.3 mm to 0.5 mm. The connector structure is a single or dual port connector structure with the standoff region configured as a void or gap proximate to the connector pins, which creates a reflow air convection gate way across a surface of the connector structure during PIP soldering.

19 Claims, 11 Drawing Sheets

(56) References Cited

U.S. PATENT DOCUMENTS

| | | | |
|---|---|---|---|
| 2015/0229075 A1* | 8/2015 | Lin ..................... | H01R 13/635 439/153 |
| 2015/0357775 A1* | 12/2015 | Yu ......................... | H01R 27/00 439/218 |
| 2015/0380868 A1* | 12/2015 | Chen ................. | H01R 13/6585 439/607.01 |
| 2017/0093061 A1* | 3/2017 | Lee ..................... | H01R 12/707 |

* cited by examiner

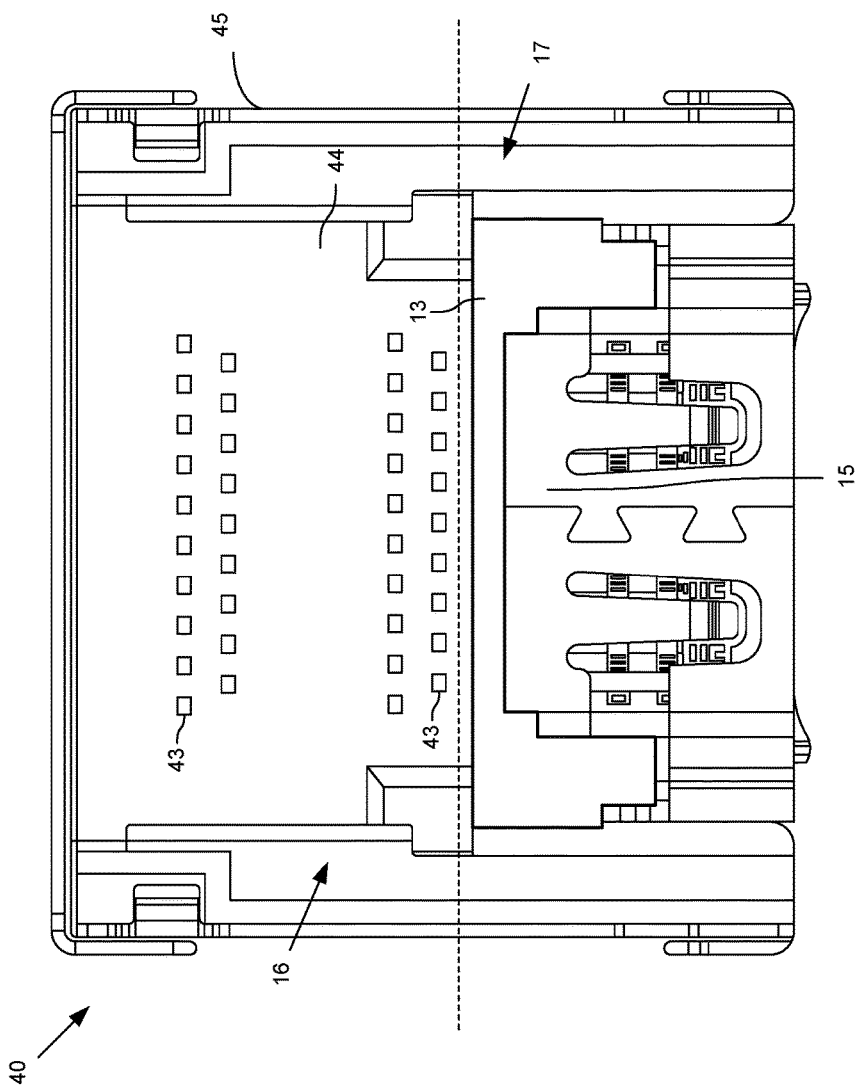

CONNECTOR STRUCTURE WITH STANDOFF REGION FOR IMPROVED SOLDERING AND METHOD OF MAKING THE SAME

TECHNICAL FIELD

The present disclosure is related to single or dual port dual-in-line plug (DIP) type connector structure such as a High-Definition Multimedia Interface (HDMI) connector used in a Pin In Paste (PIP) soldering process.

BACKGROUND

DIP type connector structures such as HDMI connectors have connector pins that are fine pitched for surface mounting onto, for example, a printed circuit board (PCB). The DIP type HDMI structures are typically surface mounted using a legacy wave soldering process. However, the defect rate of the solder connections when using the legacy wave soldering process can be high thereby impacting solder connection reliability and overall performance of the DIP type connector structures. Additionally, such defects caused by the legacy wave soldering process can be costly to correct because of the additional reworking and testing required.

To eliminate the high defect rate of the DIP type connector structures manufactured using legacy wave soldering, a Pin In Paste (PIP) soldering process has be implemented, which can typically provide improved solder connection quality. However, the conventional DIP type connector structures have exhibited solder wetting difficulty during the reflow step of the PIP soldering process. For example, the conventional DIP type connector structures include material, components, or structures on a surface and proximate to the connector pins that can block the reflow air convection and press the solder paste thereby impacting solder connection quality during the PIP soldering process.

Thus, it would be useful and a significant improvement over the relevant technology to provide a single or dual port DIP type connector structure such as an HDMI connector that does not include material, components, or structures on a surface that can block the reflow air convection or press the solder paste, which provides improved solder connections when implementing a PIP soldering process.

SUMMARY

An embodiment of the invention is a connector structure used in Pin In Paste (PIP) soldering that includes an insulative housing; at least one electrical connector received within a first surface of the insulative housing; a plurality of connector pins positioned on a first side of a second surface of the insulative housing and retained by the insulative housing; and a standoff region positioned on a second side of the second surface of the insulative housing, the standoff region being positioned adjacent to the first side including the plurality of connector pins.

The standoff region includes dimensions that provide reflow air convection on at least two sides of the second surface during PIP soldering. The standoff region is a void or gap with dimensions such as a depth or height, a length, and a width that provide the reflow air convection on at the least two sides of the second surface during PIP soldering. For example, the standoff region can have a depth or height of approximately 0.3 mm, a length of approximately 15.1 mm, and a width of approximately 4.95 mm. The standoff region can also have a depth or height in a range of 0.3 mm to 0.5 mm.

In an embodiment of the invention, the connector structure is a single or dual port HDMI connector with standoff region configured as a void or gap proximate to the connector pins, which creates a reflow air convection gate way across a surface of the HDMI connector including the connector pins during PIP soldering.

An embodiment of the invention provides a method of forming a standoff region on a connector structure used in a PIP soldering process. The connector structure includes an insulative housing, at least one electrical connector received within a first surface of the insulative housing, and connector pins positioned on a first side of a second surface of the insulative housing and retained by the insulative housing.

The method includes removing (or omitting inclusion of) insulative material or structures including a post structure and a pad structure from a second side of the second surface of an insulative housing of the connector structure thereby forming a standoff region positioned on the second side of the second surface of the insulative housing. The standoff region is positioned adjacent to the first side including connector pins and includes dimensions that provide reflow air convection on at least two sides of the second surface during PIP soldering.

The forming of the standoff region includes forming a void or gap on the second side of the second surface that is adjacent to the first side including the connector pins with dimensions such as a depth or height, a length, and a width that provide reflow air convection on at the least two sides of the second surface during PIP soldering.

For example, the standoff region can have a depth or height of at approximately 0.3 mm, a length of approximately 15.1 mm, and a width of approximately 4.95 mm. The standoff region can also have a depth or height in a range of 0.3 mm to 0.5 mm.

The removing of the post structure and the pad structure includes removing insulating material or structures from the second side of the second surface of the insulative housing of the connector. By removing (or omitting inclusion of) the pad and post structures proximate to the connectors, the soldering quality of the connector pins when using the PIP soldering process is vastly improved.

BRIEF DESCRIPTION OF THE DRAWINGS

FIG. 5A and FIG. 5B are illustrations that show in more detail the standoff region formed on a surface of the connector structure according to an embodiment of the present invention.

DETAILED DESCRIPTION

Figure 1:
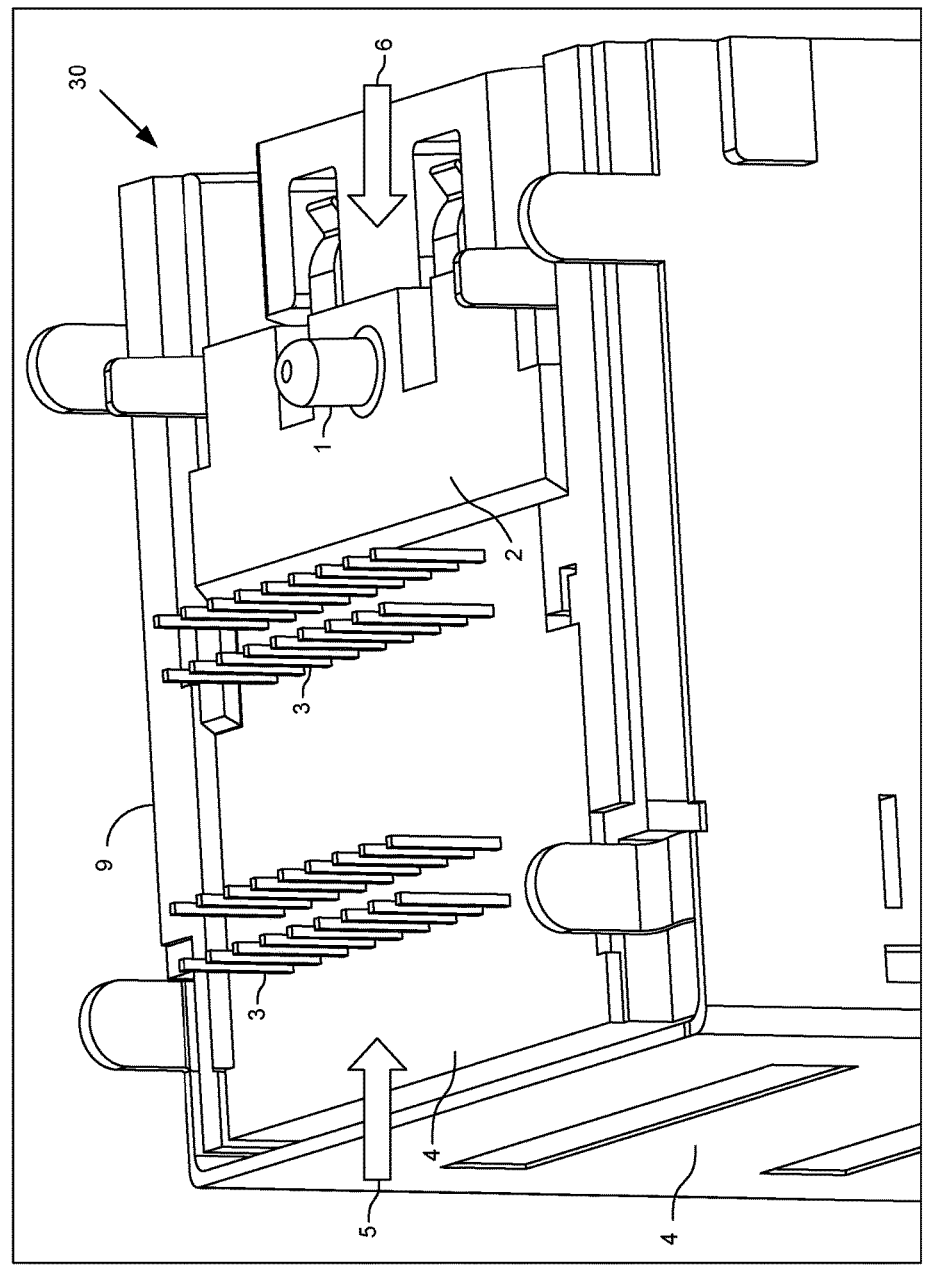
FIG. 1 is an illustration of a conventional DIP type connector structure having solder wetting difficulty during the reflow process.

FIG. 1 illustrates a conventional DIP type connector structure. As shown in FIG. 1, the DIP type connector structure is, for example, an HDMI connector 30. The HDMI connector 30 is a DIP type connector, which is generally through-hole mounted to, for example, a printed circuit board (PCB) using a Pin In Past (PIP) soldering process.

The HDMI connector 30 includes an insulative housing 4, connector pins 3, a pad 2, and a post 1. As shown in FIG. 1, the connector pins 3, a pad 2, and a post 1 are positioned on the same surface 9 of the HDMI connector 30. The HDMI connector 30 shown in FIG. 1 is a conventional DIP type HDMI structure that has solder wetting difficulty during the reflow step when using the PIP soldering process.

During the reflow step of the PIP soldering process, the reflow air convection is only allowed in a direction coming from the left side 5 across the surface 9 of the HDMI connector 30 (i.e., including the connector pins 3) when using the PIP soldering process. Conversely, the reflow air convection is blocked in a direction coming from the right side 6 of the HDMI connector 30 by the pad 2 and post 1 configured on the surface 9 of the HDMI connector 30 (i.e., including the connector pins 3). Additionally, the pad 2 can press against the solder paste, which also further impacts solder connection quality.

Thus, the conventional DIP type HDMI structures (e.g., the HDMI connector 30 shown in FIG. 1) include material, components, or structures (i.e., pad 2 and post 1) on a surface 9 proximate to the connectors pins 3 that can block the reflow air convection and press the solder paste thereby impacting solder connection quality when being attached to a PCB using the PIP soldering process.

Figure 2A:
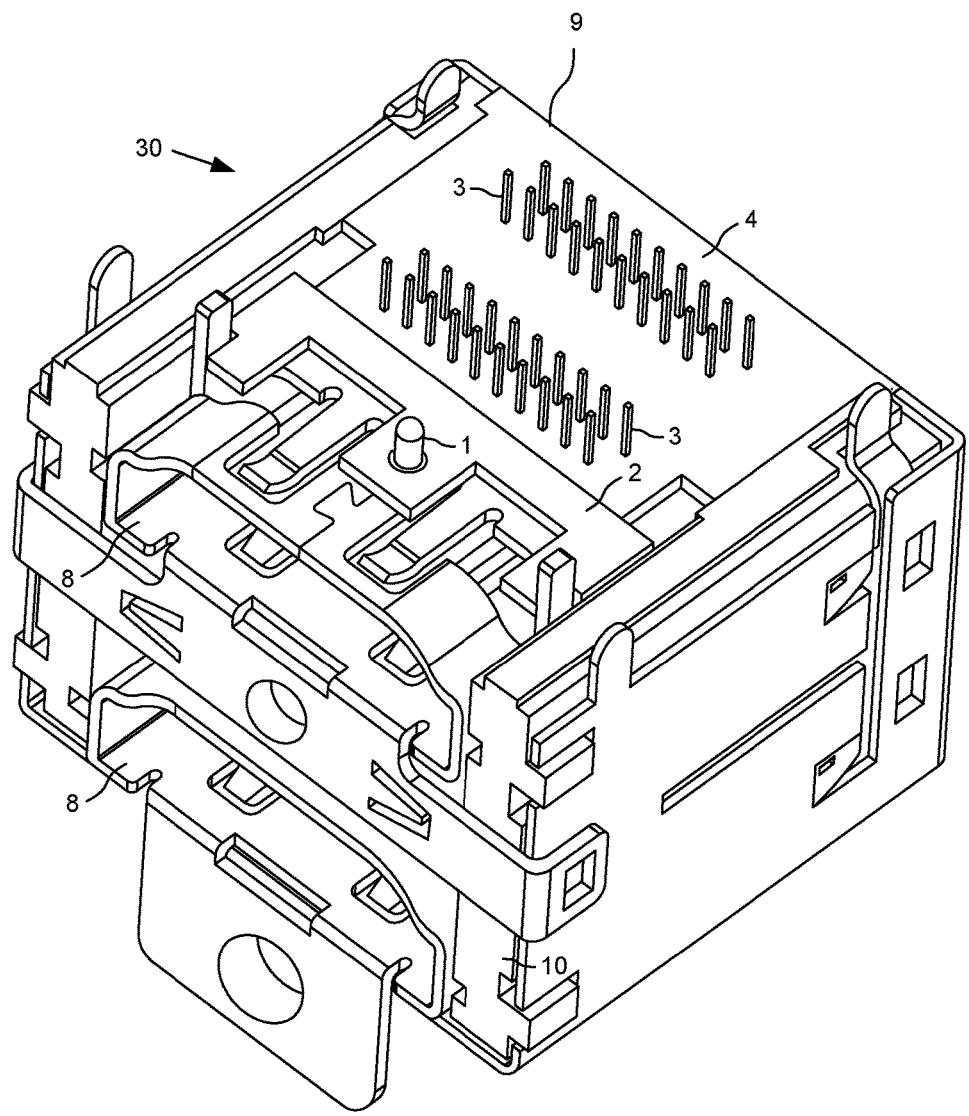
FIGS. 2A and 2B are illustrations of the components of the conventional DIP type connector structure that contribute to the solder wetting difficulty during the reflow process.
Figure 2B:
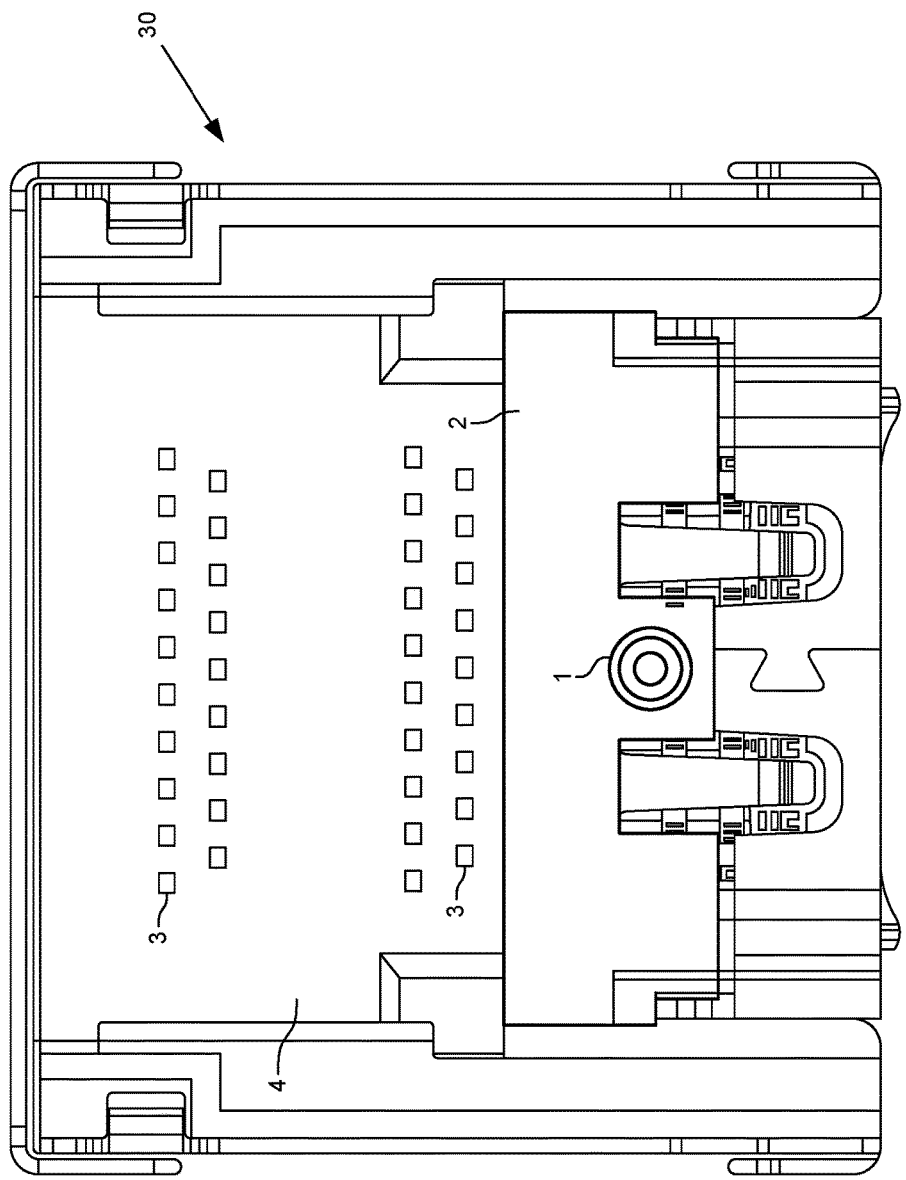

FIGS. 2A and 2B are illustrations of the components or structures on a surface of the conventional DIP type HDMI structure that contribute to the solder wetting difficulty during the reflow process.

FIGS. 2A and 2B illustrate a conventional DIP type connector structure. As shown in FIG. 2A, the DIP type connector structure is an HDMI connector 30. A DIP type connector such as the one shown in FIG. 2A is an electronic component package with a housing and one or more rows of electrical connecting pins, which is generally through-hole mounted to, for example, a printed circuit board PCB.

In FIG. 2A, the HDMI connector 30 includes an insulative housing 4, connector pins 3, a pad 2, a post 1, and electrical connectors 8. The pad 2 and the post 1 are located on the same surface 9 of the HDMI connector 30, and two electrical connectors 8 are received within a side surface 10 of the HDMI connector 30. The insulative housing 4, the pad 2, and the post 1 are typically composed of molded plastic or other similar insulative material. Additionally, the connector pins 3 are positioned on the same surface 9 of the HDMI connector 30 as the pad 2 and the post 1, but the connector pins 3 are composed of a conductive material such as metal. The electrical connectors 8 are shown as HDMI type connectors and the HDMI connector 30 is configured as a dual port HDMI type connector.

FIG. 2B illustrates the outline of the pad 2 and post 1 on the surface 9 of the HDMI connector 30 that contribute to the solder wetting difficulty during the reflow step when performing PIP soldering process. With the HDMI connector 30 shown in FIGS. 2A and 2B, the reflow air convection is only allowed across one side of the surface 9 of the HDMI connector 30, because the reflow air convection is blocked on the other side of the surface 9 of the HDMI connector 30 by the pad 2 and post 1.

Thus, the HDMI connector 30 shown in FIGS. 2A and 2B includes material, components, or structures (i.e., pad 2 and post 1) on the surface 9 proximate to the connectors pins 3 that can block the reflow air convection and press the solder paste thereby impacting solder connection quality when being attached to a PCB when using the PIP soldering process.

Thus, it would be useful and a significant improvement over the relevant technology to provide a single or dual port DIP type connector structure such as an HDMI connector that does not include material, components, or structures on a surface that block the reflow air convection and press the solder paste when using a PIP soldering process.

Figure 3A:
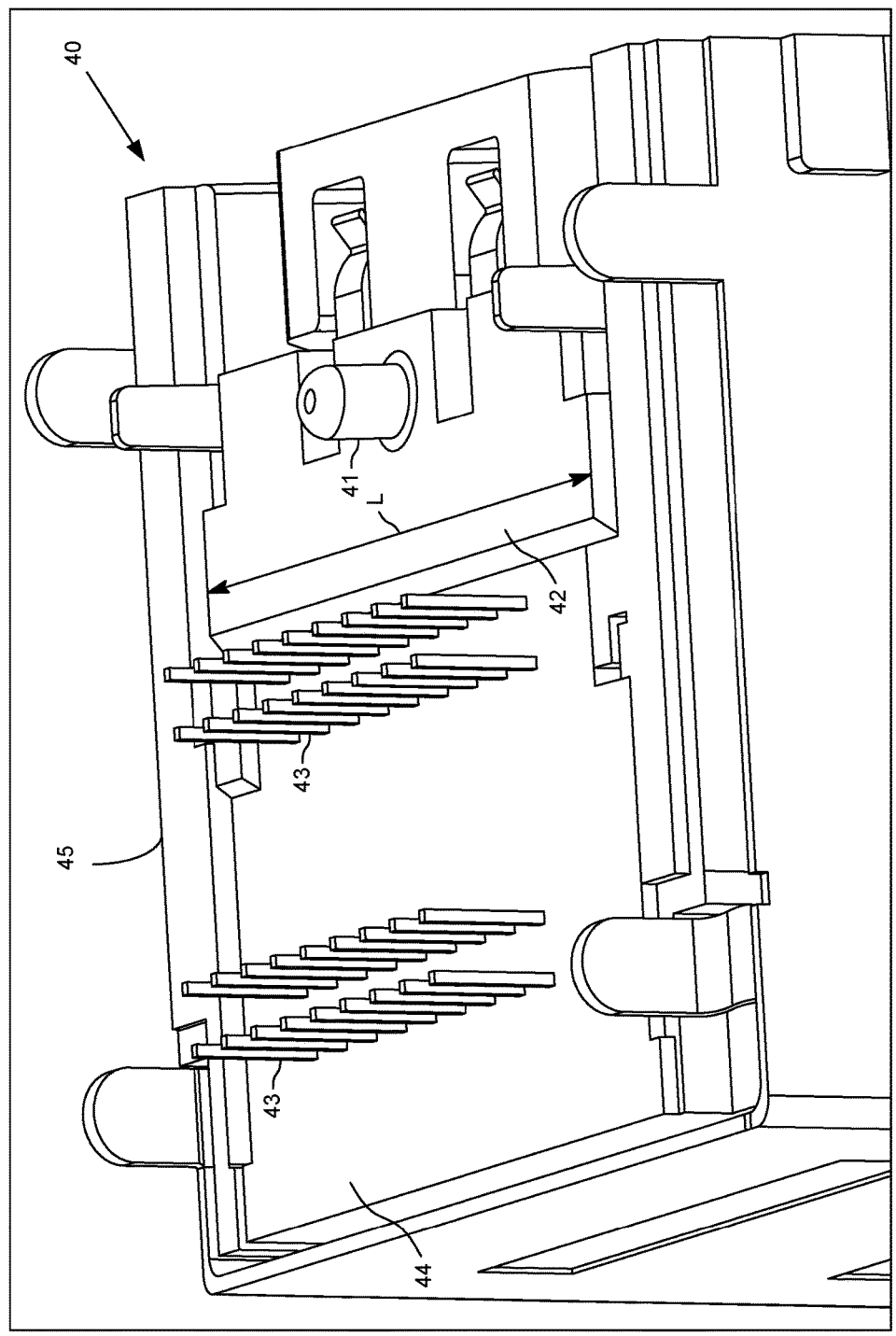
FIGS. 3A-3C are illustrations that show a method of forming the standoff region by removing a portion of a surface of a connector structure of a certain length, width, and depth or height according to an embodiment of the present invention.
Figure 3B:
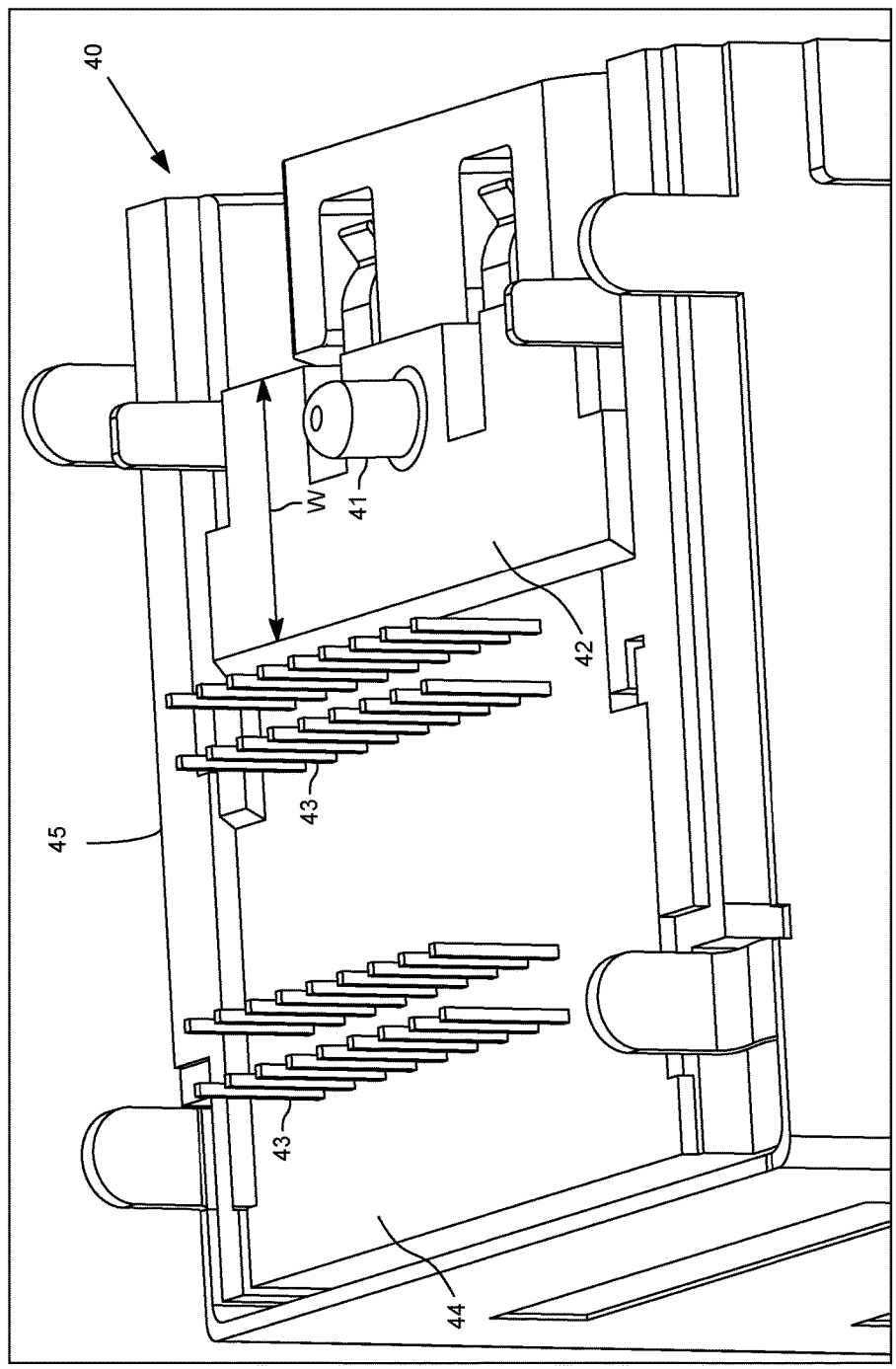
Figure 3C:
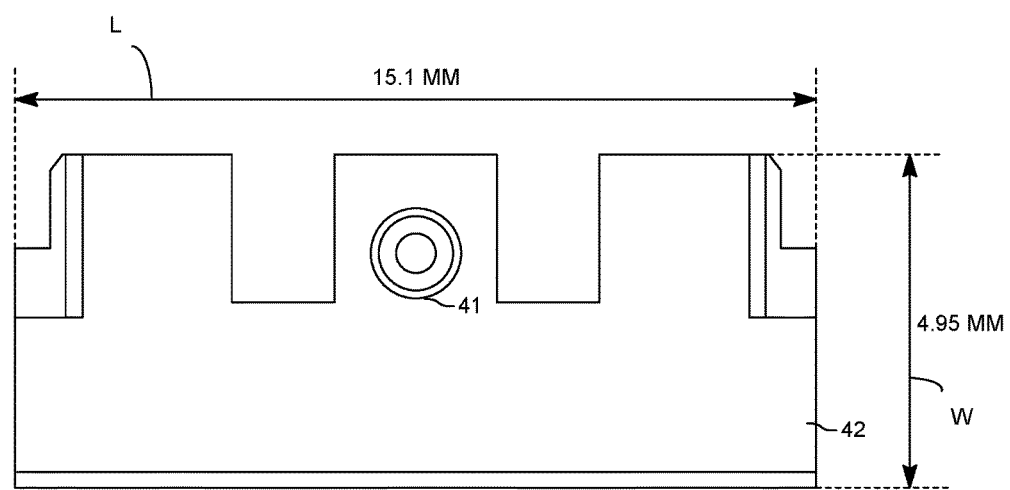

FIGS. 3A-3C show a method of forming the standoff region by removing a portion of a surface of a connector structure according to an embodiment of the present invention.

As shown in FIGS. 3A and 3B, the connector structure 40 is DIP type HDMI structure such as HDMI connector. A DIP type connector such as the one shown in FIG. 3A is an electronic component package with a housing and one or more rows of electrical connecting pins, which is generally through-hole mounted to, for example, a PCB.

Although FIGS. 3A and 3B describe the connector structure 40 as an HDMI connector, other DIP connector structures are contemplated by the invention such as Ceramic Dual In-line Package (CERDIP or CDIP), Plastic Dual In-line Package (PDIP), Shrink Plastic Dual In-line Package (SPDIP), or Skinny Dual In-line Package (SDIP or SPDIP). Moreover, variations of the DIP connector can include a single row of connector pins, two rows of connector pins, or four rows of connector pins that are surface-mount package types.

In FIGS. 3A and 3B, the connector structure 40 includes an insulative housing 44, four parallel rows of connector pins 43, a pad 42, and a post 41. The pad 42 and post 41 are positioned on the same surface 45 of the connector structure 40. Additionally, the insulative housing 44, the pad 42, and the post 41 are typically composed of molded plastic or other similar insulative materials such as ceramic or glass.

The connector pins 43 are positioned on the same surface 45 of the connector structure 40 as the pad 42 and the post 41, but the connector pins 3 are composed of a conductive material such as a metal including copper, silver, aluminum, brass, nickel, iron, or other similar metal.

Figure 4A:
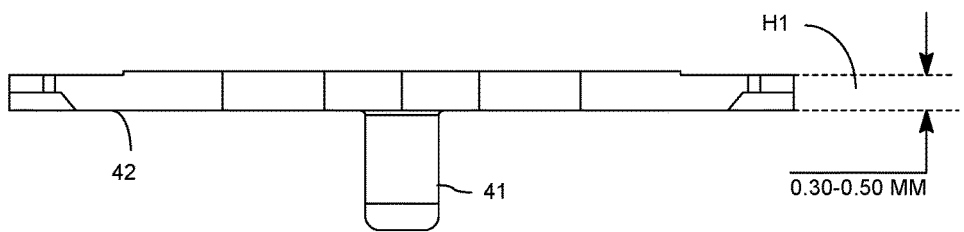
FIGS. 4A and 4B are illustrations that show the height or depth dimension of the standoff region formed on a surface of the connector structure according to an embodiment of the present invention.
Figure 4B:
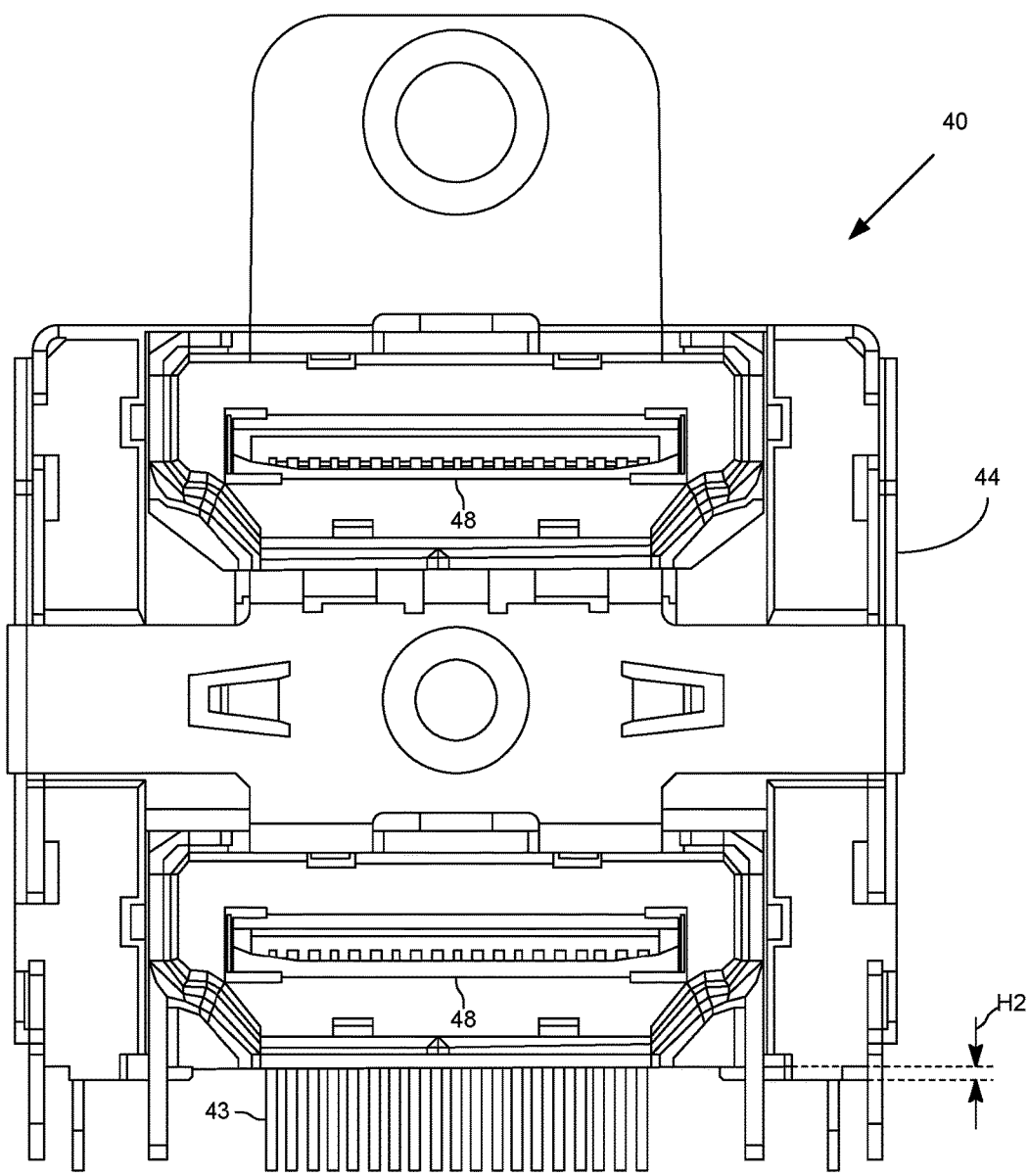

With reference to FIG. 3A-3C, the method of forming standoff region is performed by removing (or omitting inclusion of) a length L (e.g., approximately 15.1 m) and a width W (e.g., approximately 4.95 mm) of the insulative material from a surface 45 of the connector structure 40. The surface 45 of the connector structure 40 removed to form the standoff region is, for example, insulative material, components, or structures that include the pad 42 and the post 41, on the surface 45 of the connector structure 40. The depth or height H of the insulative material removed from a surface 45 of the connector structure is shown in FIG. 4 (e.g., of approximately 0.3 mm, and can be between 0.3 mm and 0.5 mm). Additionally, the standoff region will be discussed in more detail with reference to FIGS. 4A, 4B, 5A, and 5B.

The standoff region has a depth or height of approximately 0.3 mm, a length of approximately 15.1 mm, and a width of approximately 4.95 mm. The standoff region can also have a depth or height in a range of 0.3 mm to 0.5 mm. The standoff region is a void or gap with dimensions such of a depth or height, a length, and a width provide reflow air convection on at the least two sides of a surface 45 of the connector structure 40 during a PIP soldering process.

The standoff region once formed is positioned on a side of the surface 45 of the connector structure 40 that is adjacent and proximate to a side of the surface 45 of the connector structure 40 including the connector pins 43 such that reflow air convection is provided on at least two sides of the surface 45 of the connector structure 40 including the connection pins 43 during the PIP soldering process.

FIGS. 4A and 4B illustrate the height or depth dimension of the standoff region formed on a connector structure according to an embodiment of the present invention.

As shown in FIG. 4B, the connector structure 40 is, for example, a DIP type HDMI structure and the DIP type HDMI structure is, for example, an HDMI connector. A DIP type connector such as the one shown in FIG. 4B is an electronic component package with a housing and one or more rows of electrical connecting pins, which is generally through-hole mounted to, for example, a PCB.

Although FIG. 4B describes the connector structure 40 as an HDMI connector, other DIP connector structures are contemplated by the invention such as Ceramic Dual In-line Package (CERDIP or CDIP), Plastic Dual In-line Package (PDIP), Shrink Plastic Dual In-line Package (SPDIP), or Skinny Dual In-line Package (SDIP or SPDIP). Moreover, variations of the DIP connector can include a single row of connector pins, two rows of connector pins, or four rows of connector pins that are surface-mount package types.

The connector structure 40 includes an insulative housing 44, a plurality of connector pins 43 positioned on one side of a surface of the insulative housing 44 and retained by the insulative housing 44, and electrical connectors 48 received within a side surface 46 of the HDMI connector 40.

In FIG. 4B, the electrical connectors 48 are described as HDMI connectors. However, it is contemplated by the invention that the electrical connectors 48 can include a DisplayPort, Video Graphics Array (VGA) or Universal Serial Bus (USB) type connectors. Additionally, as shown in FIG. 4B, the connector structure 40 is a dual port connector. However, it is also contemplated by the invention that the connector structure 40 can be a single port connector.

The standoff region is formed by removing (or omitting inclusion of) a structure, material, or component having a depth or height H2, a length L and a width W of the insulative material from a surface of the connector structure 40, including the pad 42 and the post 41. As shown in FIG. 4A, height H1 of the insulative material, material, or component removed (or not included) including the plate 42 and the post 41 is approximately 0.3 mm, but can be in a range of 0.3 mm and 0.5 mm. FIG. 4B shows the depth or height H2 of the standoff region after removal of the insulative material (i.e., including the pad 42 and the post 41), which approximately 0.3 mm, but can be in a range of 0.3 mm and 0.5 mm.

The standoff region is a void or gap with dimensions such as a depth or height H2, a length L, and a width W provide reflow air convection on at the least two sides of a surface 45 of the connector structure 40 during a PIP soldering process.

Figure 5A:
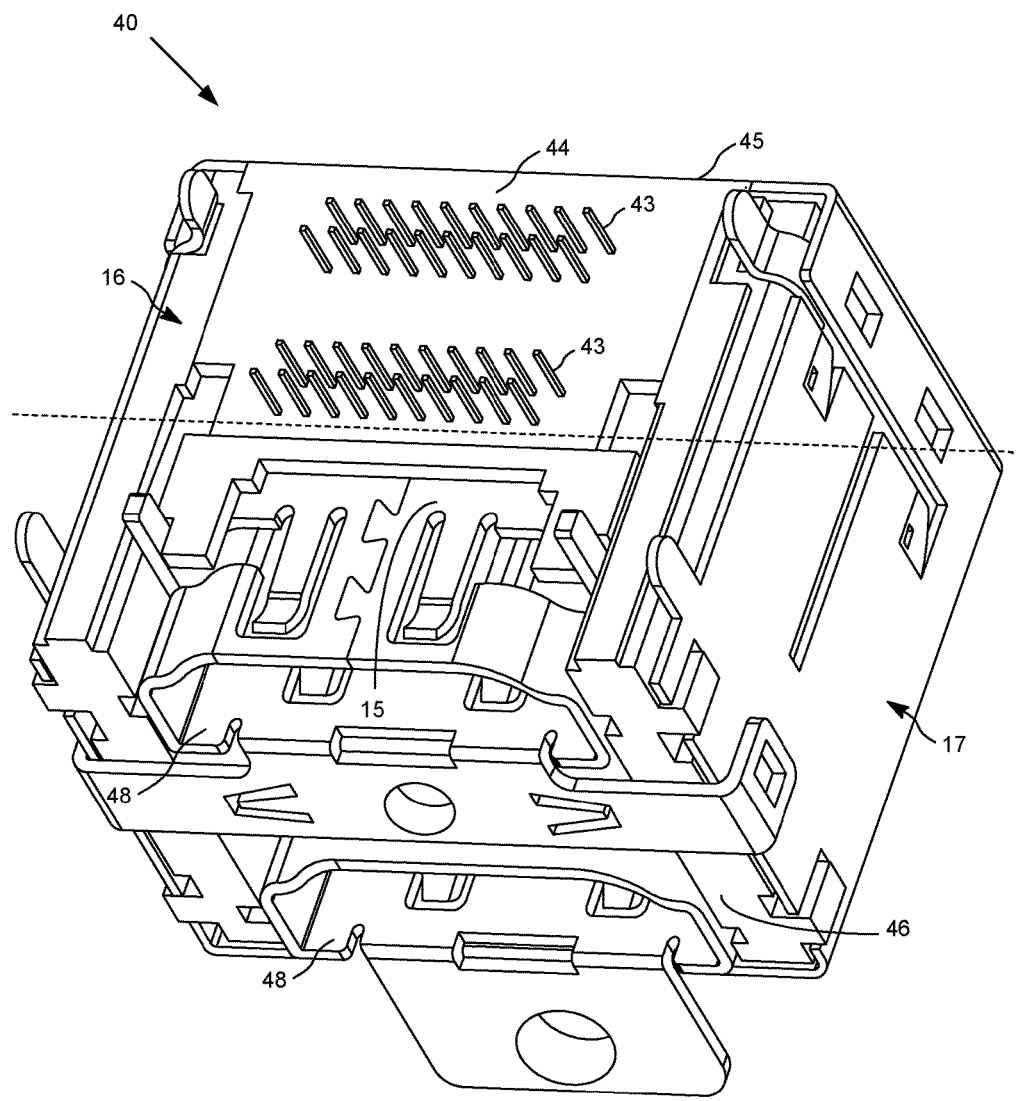

FIG. 5A and FIG. 5B illustrate in more detail the standoff region formed on a connector structure according to an embodiment of the present invention.

As shown in FIGS. 5A and 5B, the connector structure 40 is, for example, a DIP type HDMI connector. The DIP type connector such as the one shown in FIG. 5A is an electronic component package with a housing and one or more rows of electrical connecting pins, which is generally through-hole mounted to, for example, a PCB.

Although FIGS. 5A and 5B describe the connector structure 40 as an HDMI connector, other DIP connector structures are contemplated by the invention such as Ceramic Dual In-line Package (CERDIP or CDIP), Plastic Dual In-line Package (PDIP), Shrink Plastic Dual In-line Package (SPDIP), or Skinny Dual In-line Package (SDIP or SPDIP). Moreover, variations of the DIP connector can include a single row of connector pins, two rows of connector pins, or four rows of connector pins that are surface-mount package types.

As shown in FIG. 5A, the connector structure 40 includes an insulative housing 44, a plurality of connector pins 43 positioned on one side of a surface 45 of the insulative housing 44 and retained by the insulative housing 44, a standoff region 15 on the other side of the surface 45, and electrical connectors 48 received within a side surface 46 of the HDMI connector 40. The standoff region is a void or gap in the surface 45 above the electrical connectors 48.

In FIG. 5A, the electrical connectors 48 are described as HDMI connectors. However, it is contemplated by the invention that the electrical connectors 48 can include a DisplayPort, Video Graphics Array (VGA) or Universal Serial Bus (USB) type connectors. Additionally, as shown in FIG. 5A, the connector structure 40 is a dual port connector. However, it is also contemplated by the invention that the connector structure 40 can be a single port connector.

As shown in FIG. 5A, the connector pins 43 and the standoff region 15 are positioned on the same surface 45 of the HDMI connector 40. The insulative housing 44 is composed of molded plastic or other similar insulative materials such as ceramic or glass, whereas the connector pins 3 are composed of a conductive material such as a metal material including copper, silver, aluminum, brass, nickel, iron, or other similar metal.

As shown in FIG. 5A, the connector pins 43 are positioned on a first side 16 of the surface 45 of the insulative housing 44 and retained by the insulative housing 44 and the standoff region 15 is positioned on a second side 17 of the surface 45 of the insulative housing 44, such that the standoff region 15 is positioned adjacent to the first side 16 on the surface 45 of the HDMI connector 40 including the plurality of connector pins 43.

The standoff region 15 is a void or gap on the surface 45 above the electrical connectors 48 and includes dimensions that provide reflow air convection on at least two sides of the surface 45 of the connector structure 40 including the connection pins 43 during a PIP soldering process. For example, in FIG. 5A, the standoff region 15 is a void or gap on side 17 of the surface 45 that has a height or depth H2 substantially equal to the thickness of the surface 45, a width W of approximately the width of the electrical connector 48 or smaller, and a length L less than or equal to the length of the electrical connector 48. However, it is contemplated by the invention that the dimensions of the standoff region 15 can vary depending on the size of the connector structure 40.

FIG. 5B illustrates a perimeter 13 of the standoff region 15 on one side 17 of a surface 45 of the connector structure 40. The standoff region 15 is a void or gap with dimensions such as a depth or height, a length, and a width provide reflow air convection on at the least two sides of the surface 45 of the connector structure 40. For example, the standoff region 15 has a depth or approximately 0.3 mm, a length of approximately 15.1 mm, and a width of approximately 4.95 mm. The standoff region can also have a depth or height of in a range of 0.3 mm to 0.5 mm. However, it is contemplated by the invention that the dimensions of the standoff region 15 can vary depending on the size of the connector structure 40.

In an embodiment of the invention, the connector structure 40 is a single or dual port connector with standoff region 15 configured as a void or gap proximate to the connector pins 43, which creates a reflow air convection gate way across the surface 45 of the connector 40 including the connector pins 43 in at least two directions and across at least two sides of the surface 45 of the connector structure 40.

Figure 6:
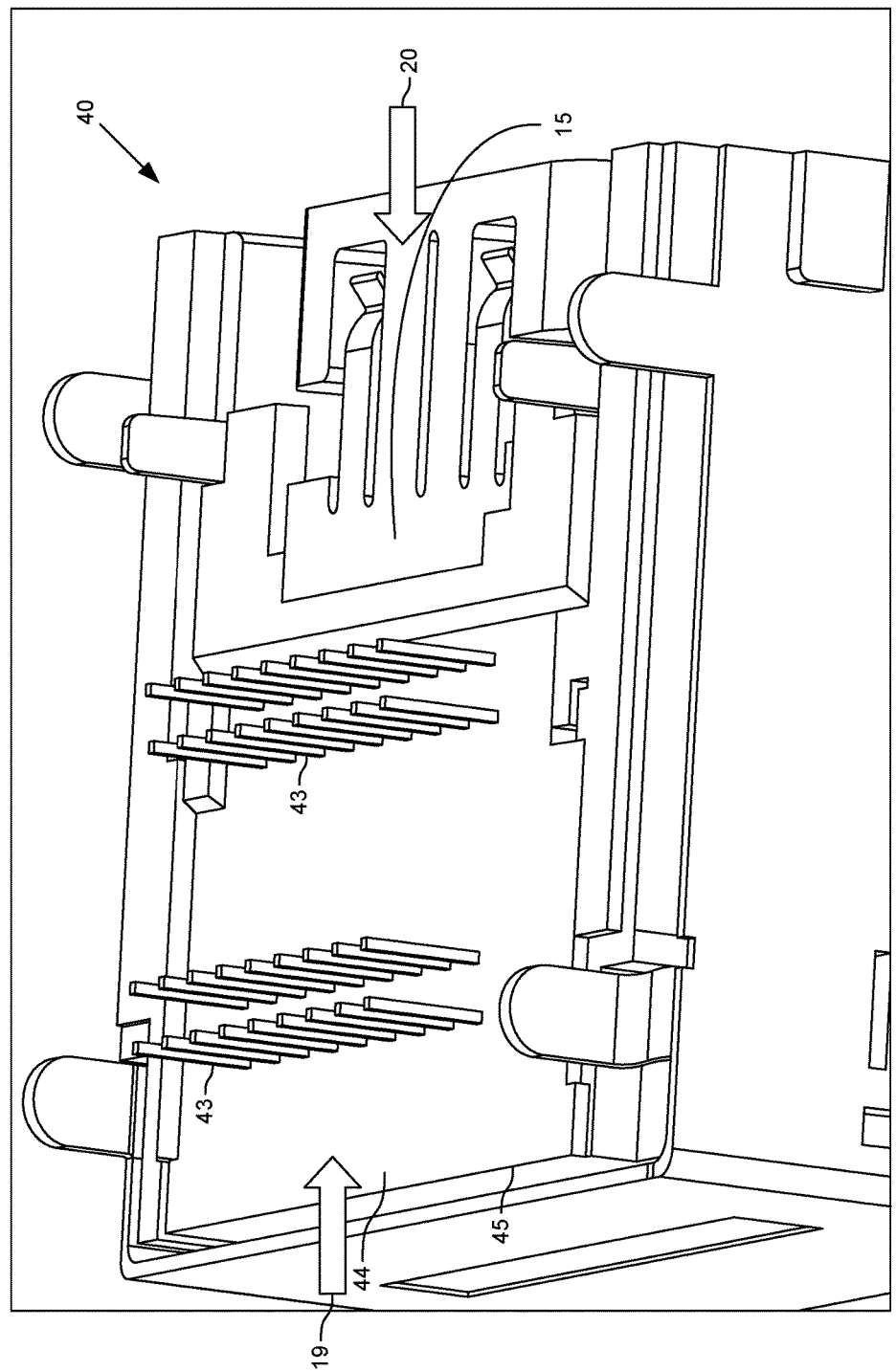
FIG. 6 is an illustration that shows the advantages provided by the standoff region formed on a surface of the connector structure according to an embodiment of the present invention.

FIG. 6 illustrates the advantages provided by the standoff region formed on a connector structure according to an embodiment of the present invention.

FIG. 6 illustrates that the connector structure 40 is a DIP type connector structure such as an HDMI connector. A DIP type connector such as the one shown in FIG. 6 is an electronic component package with a housing and one or more rows of electrical connecting pins, which is generally through-hole mounted to, for example, a PCB.

Although FIG. 6. describes the connector structure 40 as an HDMI connector, other DIP connector structures are contemplated by the invention such as Ceramic Dual In-line Package (CERDIP or CDIP), Plastic Dual In-line Package (PDIP), Shrink Plastic Dual In-line Package (SPDIP), or Skinny Dual In-line Package (SDIP or SPDIP). Moreover, variations of the DIP connector can include a single row of connector pins, two rows of connector pins, or four rows of connector pins that are surface-mount package types.

As shown in FIG. 6, the connector structure 40 includes an insulative housing 44, four parallel rows of connector pins 43 positioned on one side of a surface 45 of the insulative housing 44 and retained by the insulative housing 44, and a standoff region 15 position on another side of the surface 45 of the insulative housing 44.

As shown in FIG. 6, the reflow air convection is allowed on the left side 19 and the right side 20 across the surface 45 of the connector structure 40 (e.g., including the connector pins 43). That is, the reflow air convection is not blocked on the right side 20 because the standoff region 15 is formed on right side 20 of the connector structure 40 adjacent to the connector pins 43 on the surface 45 of the insulative housing 44.

The standoff region 15 formed on the surface 45 of the connector structure 40 is a void or gap with dimensions such as a depth or height, a length, and a width provide reflow air convection on at the least two sides of the surface 45 of the connector structure 40 during PIP soldering. For example, the standoff region can have a depth or height of approximately 0.3 mm, a length of approximately 15.1 mm, and a width of approximately 4.95 mm. The standoff region can also have a depth or height of in a range of 0.3 mm to 0.5 mm. However, it is contemplated by the invention that the dimensions of the standoff region 15 can vary depending on the size of the connector structure 40.

By removing (or omitting inclusion of) a post structure and a pad structure from the surface 45 of an insulative housing 44 of the connector structure 40, a standoff region 15 is formed and positioned adjacent to the connector pins 43 on the same surface 45 of the connector structure 40. Additionally, the standoff region 15 includes dimensions that provide reflow air convection on at least two sides of the surface 45 of the connector structure 40 including the connection pins 43 during PIP soldering process.

By removing (or omitting inclusion of) the pad and post structures proximate to the connectors 43 and forming a standoff region 15 (i.e., in place of the pad and post structures), the soldering quality when using a PIP soldering process is vastly improved.

We claim:
1. A connector structure used in Pin In Paste (PIP) soldering, comprising:
an insulative housing;
at least one electrical connector received within a first surface of the insulative housing;
a plurality of connector pins positioned on a first side of a second surface of the insulative housing and retained by the insulative housing; and
a standoff region positioned on a second side of the second surface of the insulative housing, the standoff region being positioned adjacent to the first side including the plurality of connector pins,
wherein the standoff region includes dimensions that provide reflow air convection on at least two sides of the second surface during PIP soldering, and
wherein the standoff region does not include a post structure and a pad structure on the second side of the second surface of the insulative housing of the connector structure.

2. The connector structure of claim 1, wherein the standoff region is a void or gap on the second side of the second surface that is adjacent to the first side including the plurality of connector pins.

3. The connector structure of claim 2, wherein the dimensions of the standoff region include a depth or height, a length, and a width that provide reflow air convection on at the least two sides of the second surface during PIP soldering.

4. The connector structure of claim 3, wherein the standoff region has a depth or height of approximately 0.3 mm.

5. The connector structure of claim 3, wherein the standoff region has a depth or height is a range of 0.3 mm to 0.5 mm.

6. The connector structure of claim 3, wherein the standoff region has a length of approximately 15.1 mm and a width of approximately 4.95 mm.

7. The connector structure of claim 1, wherein the connector structure is a dual-in-line plug (DIP) type HDMI connector.

8. The connector structure of claim 7, wherein the HDMI connector is a single port or dual port connector.

9. The electrical connector of claim 1, wherein the first surface is a side surface of the insulative housing.

10. The electrical connector of claim 1, wherein the second surface is a top or bottom surface of the insulative housing.

11. A method of forming a standoff region on a connector structure used in Pin In Paste (PIP) soldering, the connector structure including an insulative housing, at least one electrical connector received within a first surface of the insulative housing, and a plurality of connector pins positioned on a first side of a second surface of the insulative housing and retained by the insulative housing, the method comprising:
removing insulative material and structures from a second side of the second surface of an insulative housing of the connector structure, thereby forming a standoff region positioned on the second side of the second surface of the insulative housing, the standoff region being positioned adjacent to the first side including the plurality of connectors, wherein the standoff region has dimensions that provide reflow air convection on at least two sides of the second surface during PIP soldering, and the removing of the insulative material and structures including forming a standoff region which does not include a post structure and a pad structure from the second side of the second surface of the insulative housing of the connector structure.

12. The method of claim 11, wherein the forming of the standoff region includes forming a void or gap on the second side of the second surface that is adjacent to the first side including the plurality of connector pins.

13. The method of claim 12, wherein the dimensions of the standoff region include a depth or height, a length, and a width that provide the reflow air convection on at the least two sides of the second surface during PIP soldering.

14. The method of claim 13, wherein forming of the standoff region includes forming the depth or height of the standoff region of approximately 0.3 mm.

15. The method of claim 13, wherein forming the standoff region includes forming the length of the standoff region of approximately 15.1 mm and the width of the standoff region of approximately 4.95 mm.

16. The method of claim 11, wherein standoff region is formed on the connector structure, which is a dual-in-line plug (DIP) type HDMI connector.

17. The method of claim 16, wherein standoff region is formed on the connector structure, which is a single port or dual port connector.

18. The method of claim 11, wherein the first surface is a side surface of the insulative housing.

19. The method of claim 11, wherein the standoff region is formed on the second surface, which is a top or bottom surface of the insulative housing.

* * * * *